US009068675B2

(12) United States Patent
Mille et al.

(10) Patent No.: US 9,068,675 B2
(45) Date of Patent: Jun. 30, 2015

(54) PIPELAYING

(75) Inventors: Romain Mille, Plaisir (FR); Cesar Bourgeois, Paris (FR)

(73) Assignee: Acergy France SAS, Suresnes (FR)

( * ) Notice: Subject to any disclaimer, the term of this patent is extended or adjusted under 35 U.S.C. 154(b) by 0 days.

(21) Appl. No.: 13/982,186

(22) PCT Filed: Jan. 24, 2012

(86) PCT No.: PCT/IB2012/000360
§ 371 (c)(1),
(2), (4) Date: Jul. 26, 2013

(87) PCT Pub. No.: WO2012/101525
PCT Pub. Date: Aug. 2, 2012

(65) Prior Publication Data
US 2013/0309015 A1    Nov. 21, 2013

(30) Foreign Application Priority Data

Jan. 28, 2011    (GB) .................................. 1101508.8

(51) Int. Cl.
| | |
|---|---|
| *F16L 1/12* | (2006.01) |
| *F16L 1/18* | (2006.01) |
| *E21B 41/00* | (2006.01) |
| *F16L 1/20* | (2006.01) |
| *F16L 1/26* | (2006.01) |

(52) U.S. Cl.
CPC ............... *F16L 1/18* (2013.01); *E21B 41/0007* (2013.01); *F16L 1/20* (2013.01); *F16L 1/26* (2013.01)

(58) Field of Classification Search
USPC ............ 405/158, 166, 168.1, 169, 172, 184.4
See application file for complete search history.

(56) References Cited

U.S. PATENT DOCUMENTS

| | | | | |
|---|---|---|---|---|
| 2,188,243 | A | * | 1/1940 | Johnson ........................... 405/41 |
| 3,160,385 | A | * | 12/1964 | Di Cesare ................ 251/129.12 |
| 3,204,417 | A | * | 9/1965 | Robley ........................... 405/170 |
| 4,028,903 | A | * | 6/1977 | Dietrich ........................ 405/170 |
| 4,268,190 | A | * | 5/1981 | Tesson .......................... 405/169 |
| 5,044,825 | A | * | 9/1991 | Kaldenbach .................. 405/166 |
| 7,866,398 | B2 | * | 1/2011 | Barratt et al. ................. 166/341 |
| 2009/0297274 | A1 | * | 12/2009 | Cafaro et al. ................. 405/170 |
| 2011/0150576 | A1 | * | 6/2011 | Alliot ............................ 405/169 |

FOREIGN PATENT DOCUMENTS

| | | |
|---|---|---|
| GB | 1152220 | 5/1969 |
| GB | 2 190 168 | 11/1987 |
| GB | 2 242 251 | 9/1991 |
| GB | 2 465 117 | 5/2010 |
| GB | 2 478 548 | 9/2011 |
| WO | WO 94/19637 | 9/1994 |

* cited by examiner

*Primary Examiner* — Sean Andrish
(74) *Attorney, Agent, or Firm* — Levy & Grandinetti

(57) ABSTRACT

An accessory is disclosed for a subsea pipeline such as an in-line tee having a rigid pipe support frame defining a pipe course and at least one carriage arranged to support a pipe or a fitting attached to a pipe. The carriage is movable with respect to the frame in a direction generally parallel to the pipe course. The carriage is attached to the frame via at least one angularly movable connection that allows a pipe or fitting supported by the carriage to tilt locally with respect to the frame as the pipe bends during laying. Pipe stiffness is therefore independent from the stiffness of the accessory. The stiffened section of the pipe is limited to a short length of the carriage. This is compatible with the small bending radius of the pipe on a stinger.

48 Claims, 7 Drawing Sheets

PIPELAYING

CROSS-REFERENCE TO RELATED APPLICATIONS

This Application is the U.S. National Phase of International Application Number PCT/IB2012/000360 filed on Jan. 24, 2012, which claims priority to Great Britain Application Number 1101508.8 filed on Jan. 28, 2011.

BACKGROUND OF THE INVENTION (1) Field of the Invention

This invention relates to marine pipelaying using a vessel such as a barge to lay an offshore pipeline. The invention relates particularly to pipeline accessory structures such as in-line tees, and to pipelaying systems and methods in which such structures are incorporated into a pipeline during fabrication and are then deployed on the seabed.

In this specification, the term 'S-lay' is intended to encompass the variant Steep S-lay, as described below, unless the context requires otherwise.

(2) Description of Related Art

Marine pipelaying techniques that involve fabrication of a rigid pipeline on a vessel are generally categorised as either S-lay or J-lay, although variants and hybrids of those techniques have been proposed and used.

The S-lay technique involves welding together successive pipe sections or 'joints' at a series of working stations in a generally horizontal firing line on the deck of a pipelaying vessel, from which the pipeline is launched into the water over a stinger. A series of tensioners grip the pipe to control its movement relative to the vessel under the load of the free span of the pipe extending between the vessel and the seabed. The pipe adopts a first 'overbend' as it passes over the stinger and a second opposed bend as it nears the seabed. These opposed bends lend an S-shape to the free span of the pipe—hence 'S-lay'.

S-lay was first developed for shallow-water applications but S-lay techniques designed for shallow-water pipelaying are not suitable for pipelaying in deep and ultradeep water. The J-lay technique is usually preferred when pipelaying in such depths, particularly with wider pipes. J-lay involves welding single or multiple pipe joints onto the pipe end in an upright (i.e. substantially vertical or near-vertical) orientation in a J-lay tower on a pipelaying vessel. The pipe is launched downwardly into the water as it is formed. The pipe adopts a single bend as it nears the seabed to lend a J-shape to the free span of the pipe—hence 'J-lay'.

S-lay benefits from a long production line with several working stations, and hence speeds the pipe fabrication process. Thus, where it can be used, S-lay is often preferred to J-lay for its inherently greater lay rate. Recently, this has led to the development of a variant of S-lay known as 'Steep S-lay', which is adapted for deep and ultradeep water applications where the pipe diameter allows. As the name suggests, Steep S-lay involves setting the lift-off point of the pipe from the stinger as close to vertical as possible. Thus, the pipe experiences a substantial overbend strain in a Steep S-lay operation, undergoing a deflection through substantially 90 degrees as it passes over the stinger.

To provide operational flexibility, to create desired field layouts and to support future field extensions, pipelines are commonly fitted with accessories, both at the ends of the pipeline and within it. These accessories can include in-line tees, PLEMs, PLETs, tie-in branches, shutdown valves, pigging connections and other subsea structures.

DETAILED DESCRIPTION OF THE DRAWINGS

To describe the prior art and to provide further background to the present invention, reference will now be made to FIGS. 1 to 3 of the accompanying drawings, in which.

Figure 1:
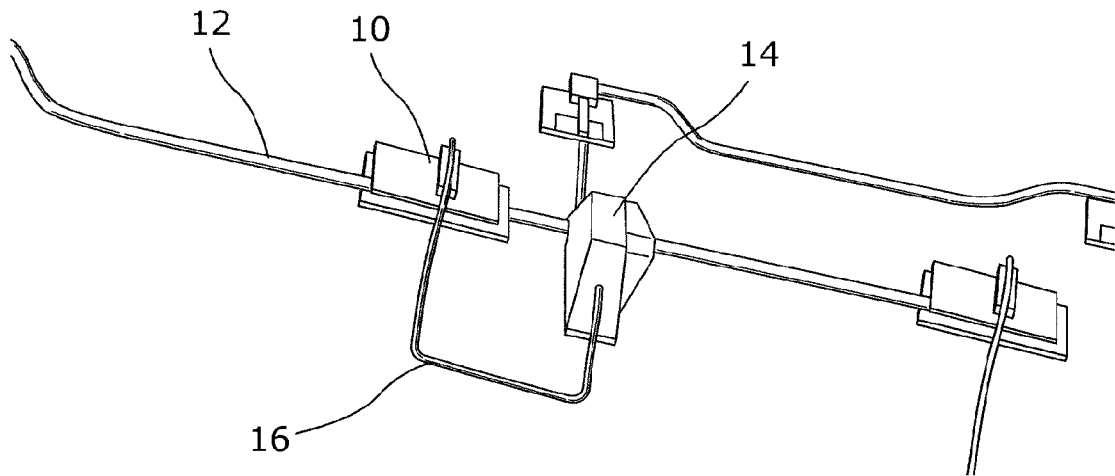
FIG. 1 is a schematic perspective view showing a typical location of an in-line tee in a subsea oilfield.

The invention will be exemplified in this specification with reference to an in-line tee or ILT. An ILT is a transition device that is used on pipelines and flowlines carrying production oil/gas or water injection fluids. The ILT is a subsea hub for connection to another system, which may be a manifold, a wellhead or a PLET. In this respect, reference is made by way of example to FIG. 1 which shows an ILT 10 in use on a flowline pipe 12 beside a subsea wellhead 14. The ILT 10 is installed directly in line with the pipe 12. The connection between the ILT 10 and the wellhead 14 is made via a subsea jumper/spool 16. The main functional parts of the ILT 10 are a connector to connect the jumper/spool 16 to the pipe 12, and a valve to control the flow through the connector.

Figure 2:
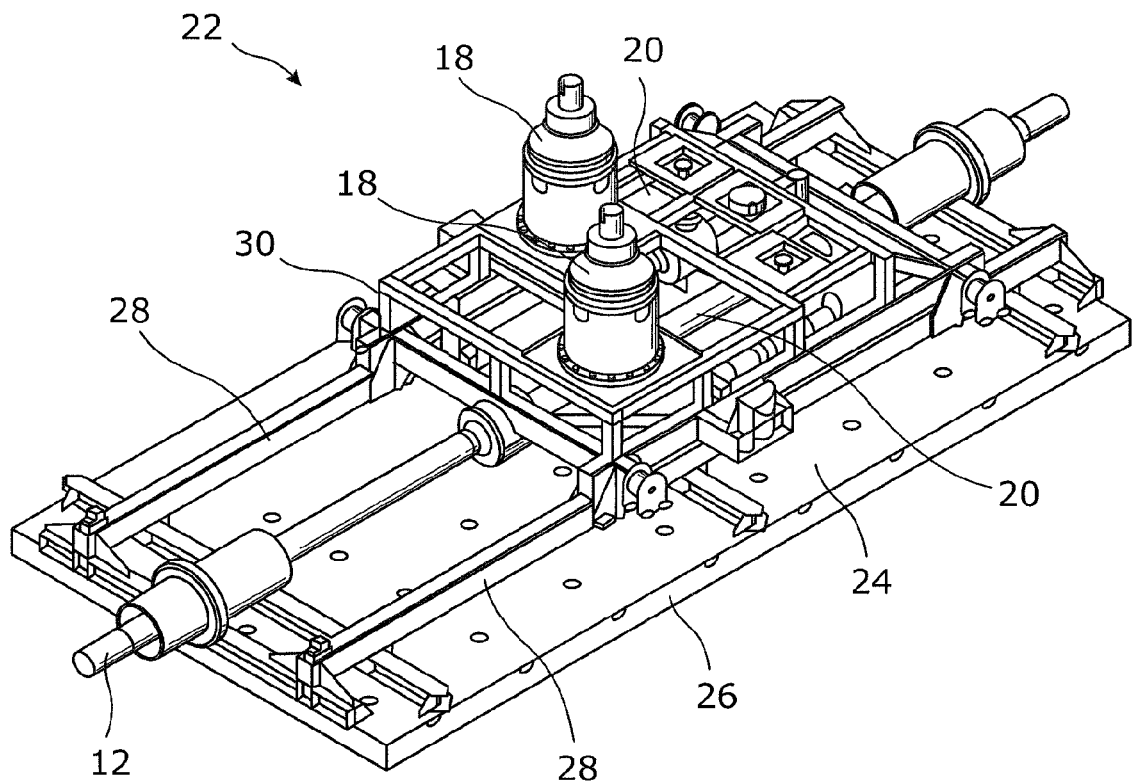
FIG. 2 is a perspective view of an in-line tee of the prior art.

An ILT may have more than one connector 18 and more than one valve 20, as shown in the prior art double ILT 22 of FIG. 2 which is adapted for water injection. The ILT 22 shown in FIG. 2 further comprises a mudmat 24 surrounded by a peripheral skirt 26, surmounted by parallel rails 28 on which a sliding frame 30 can move longitudinally with respect to the mudmat 24. The frame 30 supports the connectors 18 and valves 20 and also supports the pipe 12 to which the connectors 18 are attached. The frame 30 may also support instrumentation devices, but these are not shown in FIG. 2.

The ILT 22 must support hardware attached to the pipe 12, such as connectors 18 and pipe branches, and must resist rotation and lateral movement while also avoiding excessive settlement into the seabed. The weight of the ILT 22 must not be supported by the pipe 12 itself once on the seabed, but must instead be supported by the mudmat 24. The mudmat 24 has to cope with the high centre of gravity of the ILT 10 and the torque applied by the laterally-offset jumper/spool 16, while keeping the ILT 22 and the pipe 12 stable without becoming embedded in the mud of the seabed.

For this purpose, the mudmat 24 is long and wide to define a large base area, particularly when used in deep water where the seabed is often very soft. The skirt 26 digs into in the seabed to prevent the mudmat 24 from moving and the structure from becoming embedded. Thus, the skirt 26 locates the mudmat 24 against lateral or axial movement relative to the seabed.

As the fluids that pass through the pipe 12 in use are typically hot (circa 70-250 Celsius for oil and circa 30-60 Celsius for injected water), the length of the pipe 12 can vary considerably when the flow starts or stops. Pipe expansion must be permitted by the ILT 22 in order to avoid overstressing the pipe 12 and causing cracks or buckling. Conservatively the pipe 12 may move axially by 500 mm even when little expansion is expected, but the pipe 12 may move by up to several meters in applications carrying hot fluids. This is why an ILT 22 that has its mudmat 24 fitted with a skirt 26 needs to have a sliding frame 30 movable longitudinally on rails 28, to allow the pipe 12 (and the connectors 18, valves 20, pipe branches and other elements carried by the sliding frame 30) to move axially relative to the fixed mudmat 24.

Clearly, pipeline installation is not solely a pipelaying activity but it also involves handling and lowering large accessories such as ILTs attached to the pipe. Consequently, the overall speed of pipeline installation is not determined simply by the rate at which a vessel can lay pipe, but also by the ability of the vessel to install accessories as part of the pipeline. In this respect, a weakness of S-lay is the integration of large accessories with the pipeline, which may need to be installed over the side of the vessel and hence interrupt the laying operation. J-lay is better suited than S-lay to adding such accessories to the pipeline, which tends to offset the inherently greater lay rate of S-lay.

To ease the integration of large accessories in S-lay operations, a solution is to pass only a part of the accessory structure through open tensioners of a pipelaying vessel, and then to assemble the full structure after or downstream of the tensioners. However, there is clearly a limit to the size of structure that may pass through the tensioners; also, the deck layout of the vessel may impose space constraints after the tensioners.

Figure 3:
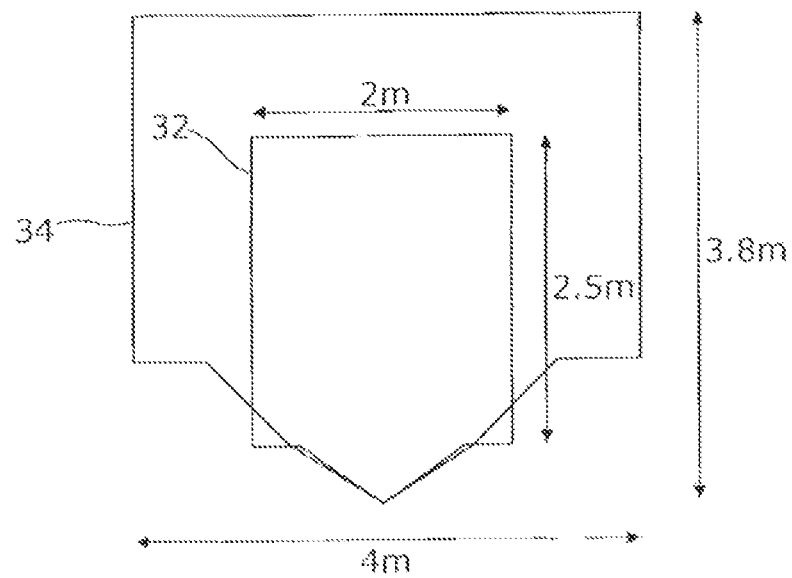
FIG. 3 is a diagram illustrating typical cross-sectional envelopes that are available for structures to pass along the firing line of a pipelaying vessel.
Figure 4:
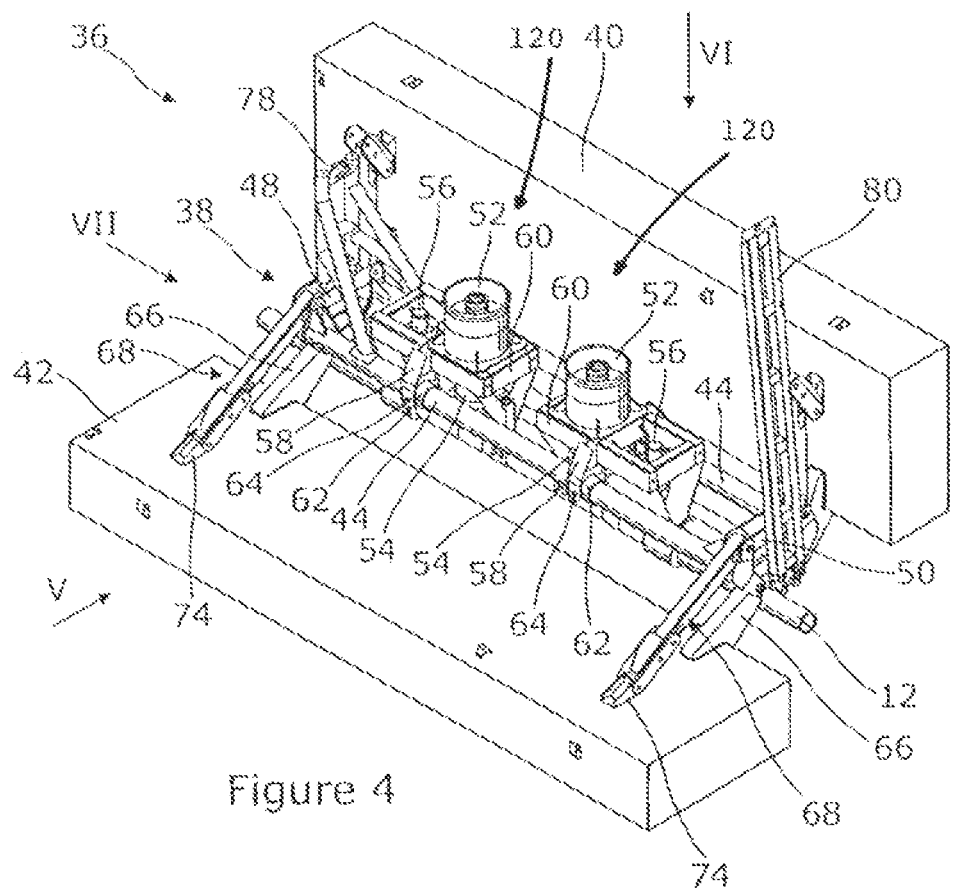
FIG. 4 is a perspective view of an in accordance with the invention having two folding mudmats with one mudmat shown in a folded position and the other mudmat shown in a deployed position.
Figure 5:
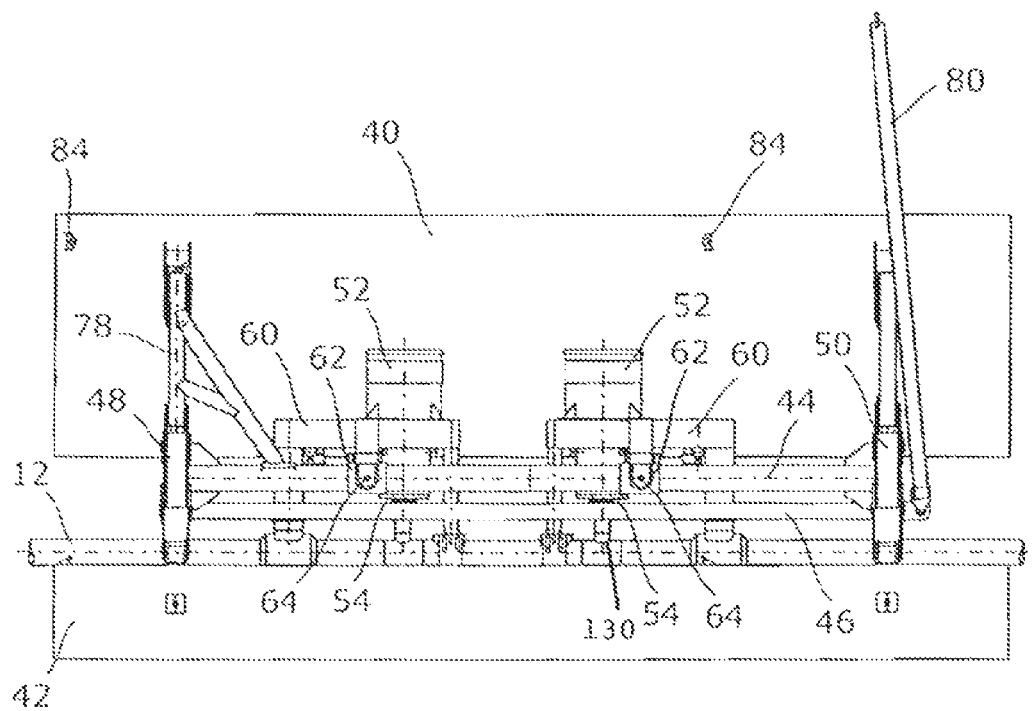
FIG. 5 is a side view of the ILT of FIG. 4, in the direction of arrow V of FIG. 4.
Figure 6:
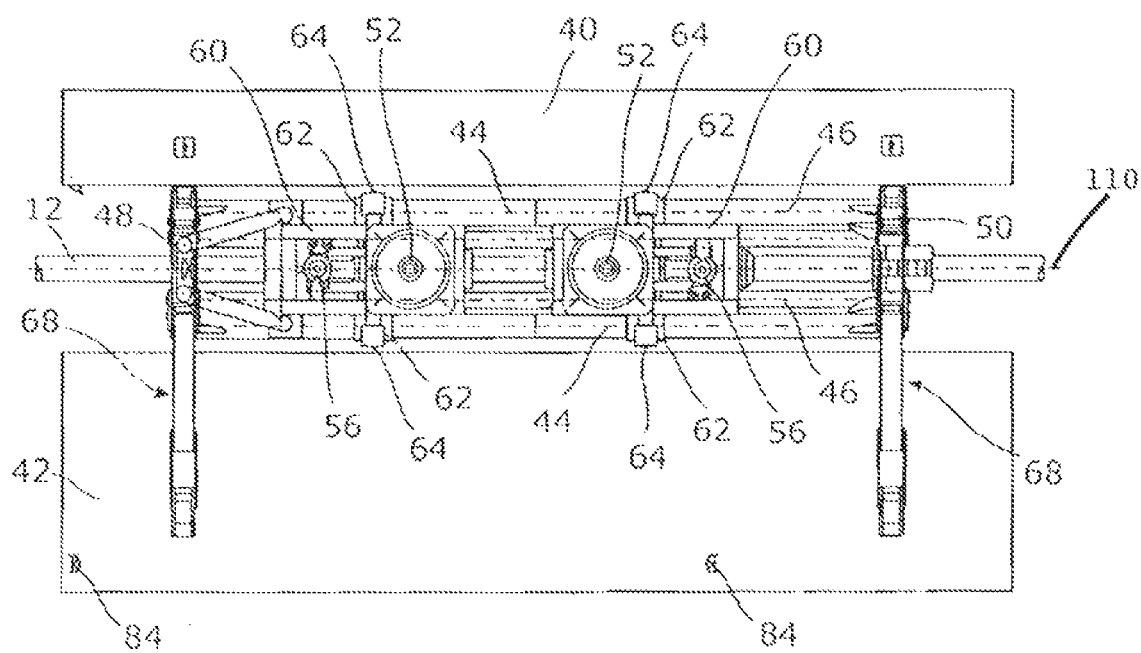
FIG. 6 is a top plan view of the ILT of FIGS. 4 and 5 in the direction of arrow VI of FIG. 4.

The effect of such constraints is shown in FIG. 3 of the drawings, which illustrate the free passage by showing the shape and maximum size of structures that can pass along the firing line of a typical pipelaying vessel. The inner line 32 shows the envelope of the free passage that is available through the tensioners, and the outer line 34 shows the envelope of the free passage that is available after the tensioners. Both envelopes have a V shape at the bottom, arising from the rollerboxes that support the pipe along the firing line. The dimensions shown in FIG. 3 are merely examples for ease of understanding.

To address these space constraints, pipeline accessories may be fitted with foldable mudmats that are overboarded in a compact folded configuration and then opened into a deployed configuration upon or before reaching the seabed. However, the size and stiffness of mudmats, particularly in a folded position, is not compatible with the small bending radius of the pipe on the stinger. This is a problem in S-lay operations in general but is a particular problem in Steep S-lay operations, where the radius of curvature of the stinger is smaller and the overbend strain is much greater, imparting stress in the pipe that may be very close to its yield stress.

There is also the problem of controlling the orientation of the accessory during pipelaying. The accessory must be kept upright as it passes over the stinger and when it is supported mid-water in the free span of the pipe after launching from the installation vessel and before touchdown on the seabed.

There is also a need to ensure easy access for the connection of jumpers to the accessory after deployment.

Mudmats could of course be pre-installed on the seabed, but this adds greatly to the cost and complexity of the pipelaying operation.

It is against this background that the present invention has been devised.

SUMMARY OF THE INVENTION

Detailed Description of the Invention

In one sense, the invention resides in an accessory for a subsea pipeline, the accessory comprising: a rigid pipe support frame defining a pipe course; and at least one carriage arranged to support a pipe or a fitting attached to a pipe, the carriage being movable with respect to the frame in a direction generally parallel to the pipe course; wherein the carriage is attached to the frame via at least one angularly movable connection that allows a pipe or fitting supported by the carriage to tilt locally with respect to the frame as the pipe bends during laying.

The invention makes the pipe stiffness independent from the stiffness of the accessory. The stiffened section of the pipe is limited to a short length of the carriage. This is compatible with the small bending radius of the pipe on a stinger. More specifically, therefore, the angularly movable connection decouples the rigidity of the frame from the pipe under loads in a generally vertical plane that bend the pipe during laying. The connection may, for example, comprise a pivot joint acting between the carriage and the frame, with a pivot axis being substantially orthogonal to the pipe course.

To locate the pipe, the carriage should still resist movement of the pipe or fitting relative to the frame in a direction transverse to the pipe course.

To cater for accessories such as double ILTs, it is preferred that the accessory of the invention comprises at least two carriages each arranged to support a pipe or a fitting attached to a pipe, which are suitably movable in series on the frame. The carriages are movable independently with respect to the frame in a direction generally parallel to the pipe course. Each carriage is attached to the frame via at least one angularly movable connection that allows the pipe or fitting supported by the carriage to tilt with respect to the frame as the pipe bends during laying.

The frame suitably comprises at least one rail substantially aligned with the pipe course, along which the carriage is movable. For example, the frame may comprise a plurality of generally parallel longitudinal structural members, with at least one of those structural members being a rail along which the carriage is movable. More preferably, there are at least two rails with a gap between them, at least one rail being disposed to each side of a plane containing the pipe course, with the or each carriage being engaged with both rails, intersecting that plane and bridging the gap between the rails. This provides a stable and symmetrically-balanced arrangement. The carriage is exemplified in the following description as a bridge member extending between two rails.

The accessory of the invention preferably further comprises a foundation to which the frame is attached, the foundation being arranged to rest on the seabed when the pipeline is laid. That foundation suitably comprises one or more mudmats that are movable with respect to the frame between a folded position and a deployed position.

In an advantageously simple arrangement, a mudmat is movable with respect to the frame about a pivot axis, and has a centre of gravity that is outboard of the pivot axis when in the folded position. This allows the mudmat to deploy under its own weight when released. It is therefore preferred that the accessory further comprises a restraint, such as a rope that may be cut by an ROV, for holding the mudmat in the folded position against gravitational force. Elegantly, one such restraint may act on two mudmats and be capable of releasing both mudmats simultaneously for coordinated movement into the deployed position. Thus, the invention preferably involves simultaneously deploying foundation members from the accessory in opposed lateral directions with respect to the longitudinal axis of the pipe.

A variable-length link is preferably provided between a mudmat and the frame to allow the mudmat to fold and to control the position of the mudmat when deployed. For stability, that link is preferably lockable in an extended position when a mudmat is deployed.

To avoid obstructions beside the firing line on a vessel, a mudmat is preferably elevated above the level of the pipe course when in the folded position. The mudmat is then lowered toward the level of the pipe course in the deployed position.

The carriage may support a pipe fitting comprising a piping branch, a connector, a valve and/or a valve actuator. The carriage may comprise a cradle for supporting a connector; the cradle may further support a valve actuator beside the connector.

Advantageously, the accessory of the invention further comprises longitudinally-spaced rigging supports for the attachment of rigging elements to support the load of the accessory. The rigging supports are suitably located at or near opposed ends of the frame and are preferably located substantially in a vertical plane containing the pipe course. This arrangement avoids blocking the deployment of folding mudmats.

Where rigging elements are attached to the rigging supports, those rigging elements are preferably variable in their effective length as the accessory changes in orientation during laying. For example, the rigging elements may be respective ends of a cable or the like, suspended by a sheave through which the cable can pass.

To resist rotation of the accessory with respect to a rigging element, it is preferred that at least one of the rigging supports comprises an elongate lever that extends to an elevated position above the frame. The elongate lever is suitably hinged on an axis transverse to the pipe course, to pivot as orientation of the accessory changes during laying. The elongate lever applies stabilising leverage to the rigging element at an elevated position above the frame.

In general, the accessory of the invention is preferably substantially symmetrical about a vertical plane containing the pipe course.

When a pipe extends along the pipe course of the accessory, the pipe is advantageously supported beneath the structural members of the frame. This places the pipe in the V-shaped envelope defined by rollerboxes, while maximising space available for the accessory in the firing line.

The pipe suitably comprises at least one piping branch extending transversely with respect to the pipe. That piping branch may lead to a valve, in which case there is suitably a valve actuator for operating the valve. It is preferred that the actuator is rotatable about an axis transverse to the pipe—and more specifically that the axis of rotation of the actuator is generally vertical when the accessory is on the seabed in use—as this eases access for ROV operation. Thus, a gear system may be provided between the actuator and the valve to change the direction of drive torque applied to the actuator.

It is also possible for the piping branch to lead to a connector. For compactness, it is preferred that the piping branch, the valve and/or the connector are substantially coplanar with the pipe. There may be two such piping branches extending transversely with respect to the pipe, and those piping branches may diverge or converge as the pipe bends during laying within a plane that contains the piping branches and the pipe.

Within the inventive concept, the invention extends to a method of laying a subsea pipeline from a vessel, comprising: overboarding an accessory that is attached to a pipe directly or via a pipe fitting and that is longitudinally rigid in relation to the pipe; causing the pipe to bend relative to the accessory about a centre of curvature above or below the pipe; and accommodating said bending of the pipe by permitting angular movement of the pipe or the fitting where it is attached to the accessory. The method of the invention is most advantageously practised in an S-lay operation involving bending the pipe over a stinger.

Referring firstly to FIGS. 4 to 7 of the drawings, an in-line accessory in accordance with the invention—exemplified here as an ILT 36—comprises a frame 38 to which folding mudmats 40, 42 are pivotally attached, thereby defining the pipe course 110. Typically the mudmats will have a surface area of about 50 m$^2$ and will be fitted with skirts 300 m deep, but these exemplary figures are provided solely for illustration and are not limiting.

For the purpose of illustration, one mudmat 40 is shown in FIGS. 4 to 7 in a folded position and the other mudmat 42 is shown in a deployed position. However, in practice, both mudmats 40, 42 will always adopt corresponding positions—either folded, deployed or in transition while being deployed. This is to maintain symmetry about a central vertical longitudinal plane and hence to prevent imbalance, which would apply an unwanted torque around a longitudinal axis of the ILT 36.

The frame 38 comprises a pair of parallel longitudinal tubular rails 44 and a pair of parallel longitudinal tubular struts 46 that connect end structures 48, 50, one at each end of the frame 38. The end structures 48, 50, in turn, support the pair of rails 44 and the pair of struts 46 in respective planes that are parallel to each other and that also lie generally parallel to the seabed when the ILT 36 is in use. The plane of the rails 44 lies above the plane of the struts 46 and the horizontal spacing between the rails 44 is greater than the horizontal spacing between the struts 46. The cross-sectional shape of the frame 38 defined by the rails 44 and the struts 46 is an isosceles trapezium that is symmetrical about a central vertical plane.

A pipe 12 of, for example, 10.75" (273 mm) diameter extends generally parallel to the rails 44 and the struts 46, at a central position disposed between but beneath the struts 46.

Two longitudinally-spaced connectors 52 extend orthogonally from the pipe 12 surmounting ball valves 54 attached to the pipe 12. A spacing of 2100 mm between the connectors is typical but not essential. Ball valve actuators 56, one beside each connector 52, have an advantageously vertical axis whereby an ROV (not shown) can more easily drive a torque tool into engagement with the actuator 56. To enable this orientation of the actuator axis, a bevel gear arrangement beneath each actuator 56 transmits torque from the actuator 56 to the associated ball valve 54 disposed under the connector 52.

Referring back to FIG. 3, it will be recalled that the rollerboxes along the firing line impart a V shape to the envelope at the bottom of the free passage through and after the tensioners. It follows that the branch piping 130 of, for example 6" (150 mm) diameter leading from the pipe 12 to the ball valves 54 and connectors 52 cannot be too close to the horizontal if it is to remain inside the V. Hence it is advantageous to place the branch piping 130, ball valves 54 and connectors 52 vertically above the pipe 12. This also avoids the use of elbows, which saves cost.

Each connector 52, ball valve 54 and actuator 56 is coupled to both rails 44 via a respective bridge member 58 that spans the gap between the rails 44. Each connector 52, ball valve 54 and actuator 56 is also attached to the pipe 12, either directly or via a cradle 60 that is attached to both the bridge member 58 and the pipe 12. Each cradle 60 is oblong in plan, with the connector 52 disposed toward one end of the oblong and the associated actuator 56 disposed toward the other end of the oblong.

A pair of parallel bearing sleeves 62 is attached to each bridge member 58, one bearing sleeve 62 being at each end of the bridge member 58. The bearing sleeves 62 receive the rails 44 as a sliding fit whereby the bridge members 58 may slide independently along the rails 44. Thus, the connectors 52, ball valves 54 and actuators 56 carried by the bridge members 58 and the cradles 60 (collectively the carriage 120) are movable longitudinally with respect to the frame 38 and hence with respect to the mudmats 40, 42. This movement accommodates axial movement of the pipe 12 and hence of the connectors 52, ball valves 54 and actuators 56 with respect to the static parts of the ILT 36 under fluctuating thermal stresses and other axial loads on the pipe 12. Provision for pipe expansion of 1.58 m including a contingency of 0.50 m is typical, by way of example.

A pivot coupling 64 acts between the bridge member 58 and the bearing sleeves 62 whereby the connectors 52, ball valves 54 and actuators 56 carried by the bridge members 58 and the cradles 60 can tilt with respect to the rails 44. For this purpose, the pivot coupling 64 of each bearing sleeve 62 defines a pivot axis that intersects and is orthogonal to the longitudinal axis of the associated rail 44. Also, the pivot axis of the pivot coupling 64 is disposed centrally with respect to the length of the associated cradle 60.

Figure 11:
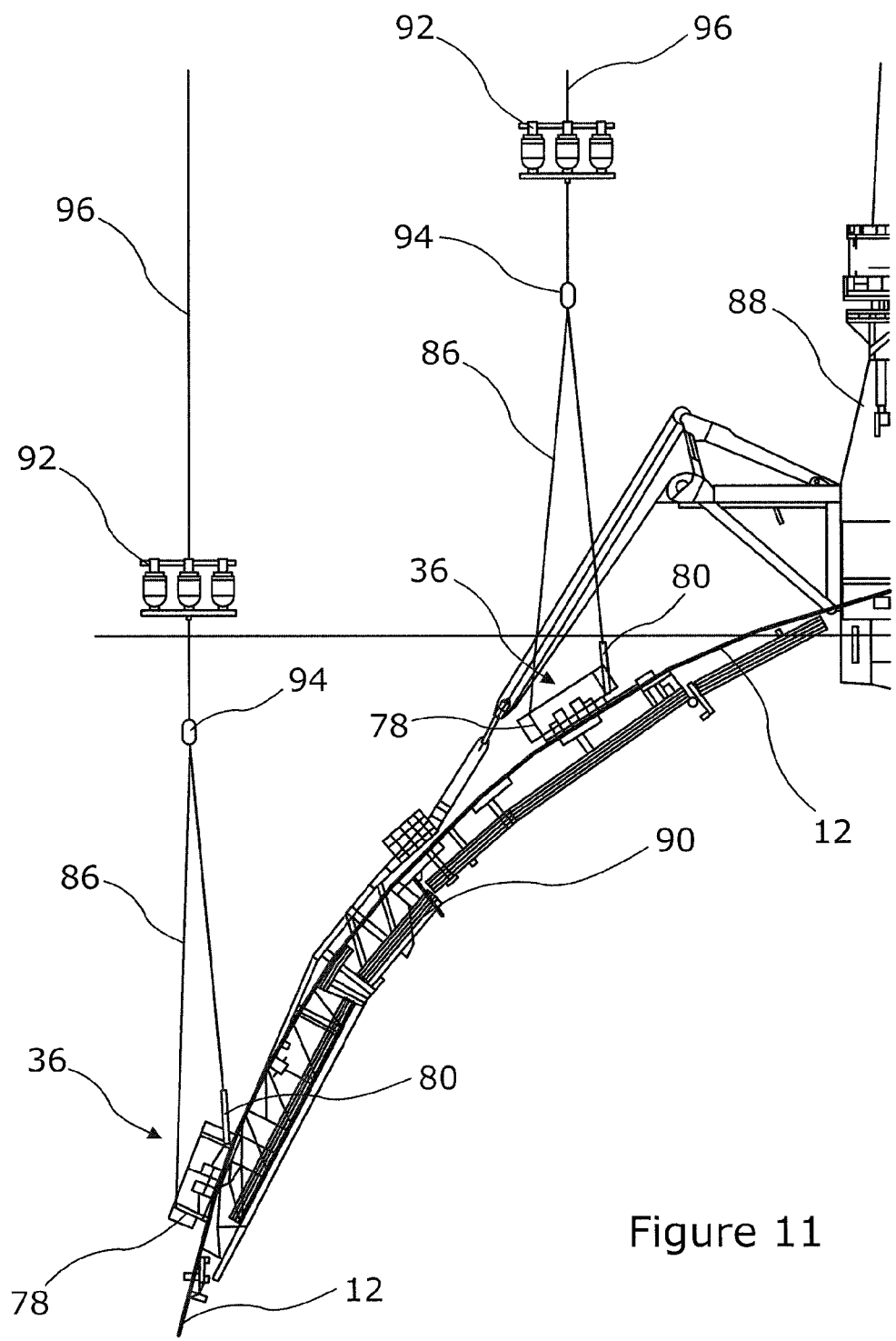
FIG. 11 is a schematic side view of the ILT of FIGS. 8 and 9 with folded mudmats being overboarded from a pipelaying vessel in a Steep S-lay operation as part of a pipeline curving along a stinger.

This tilting facility allows the pipe 12 to bend with respect to the rails 44 about a centre of curvature below the longitudinal axis of the pipe 12, as when a pipeline passes over a stinger in an S-lay operation as shown in FIG. 11 of the drawings. In this respect, it will be understood that the axes of the respective connectors 52 and ball valves 54 that are orthogonal to the pipe 12 will no longer be mutually parallel when the pipe 12 bends in that manner. Instead, their axes will diverge moving away from the centre of curvature of the pipe 12. This is why the pivot couplings 64 are necessary to allow the connectors 52, ball valves 54 and actuators 56 carried by the bridge members 58 and the cradles 60 to tilt with respect to the rails 44 as the pipe 12 bends.

It will also be apparent that when the axes of the connectors 52 and ball valves 54 diverge in the manner specified above, the spacing between those axes will widen where they intersect the plane of the rails 44. This is why it is necessary for the bridge members 58 and the cradles 60 to be movable independently along the rails 44. However, at least one of the bridge members 58 may be temporarily locked to the rails 44 to locate the frame 38 of the ILT 36 with respect to the pipe 12 during deployment.

The mudmats 40, 42 are pivotably attached to the end structures 48, 50 of the frame 38 about pivot axes that extend parallel to the rails 44. Specifically, each mudmat 40, 42 is an elongate oblong that is joined near each end to a respective end structure 48, 50 by a lower swing arm 66 and by an upper two-part articulated link 68. The fixed-length swing arms 66 define the pivot axes about which the mudmats 40, 42 fold, and the articulated links 68 have variable length to control and limit the unfolding movement upon deployment. Details of the swing arms 66 and the articulated links 68 are best appreciated in the end view of FIG. 7.

Each swing arm 66 joins an inboard edge of a mudmat 40, 42 to an end structure 48, 50 of the frame 38. The swing arm 66 is fixed at an outboard end to the mudmat 40, 42 and is pivotable at an inboard end about a pivot axis aligned with a strut 46 of the frame 38.

Each articulated link 68 comprises an inner arm 70 and an outer arm 72. The inner arm 70 is pivotable at an inboard end about a pivot axis disposed above a rail 44 of the frame 38; at its outer end, the inner arm 70 is hinged to the outer arm 72. The outer arm 72, in turn, is hinged to a pivot bracket 74 affixed to the mudmat 40, 42 in longitudinal alignment with and outboard of the swing arm 66.

Figure 7:
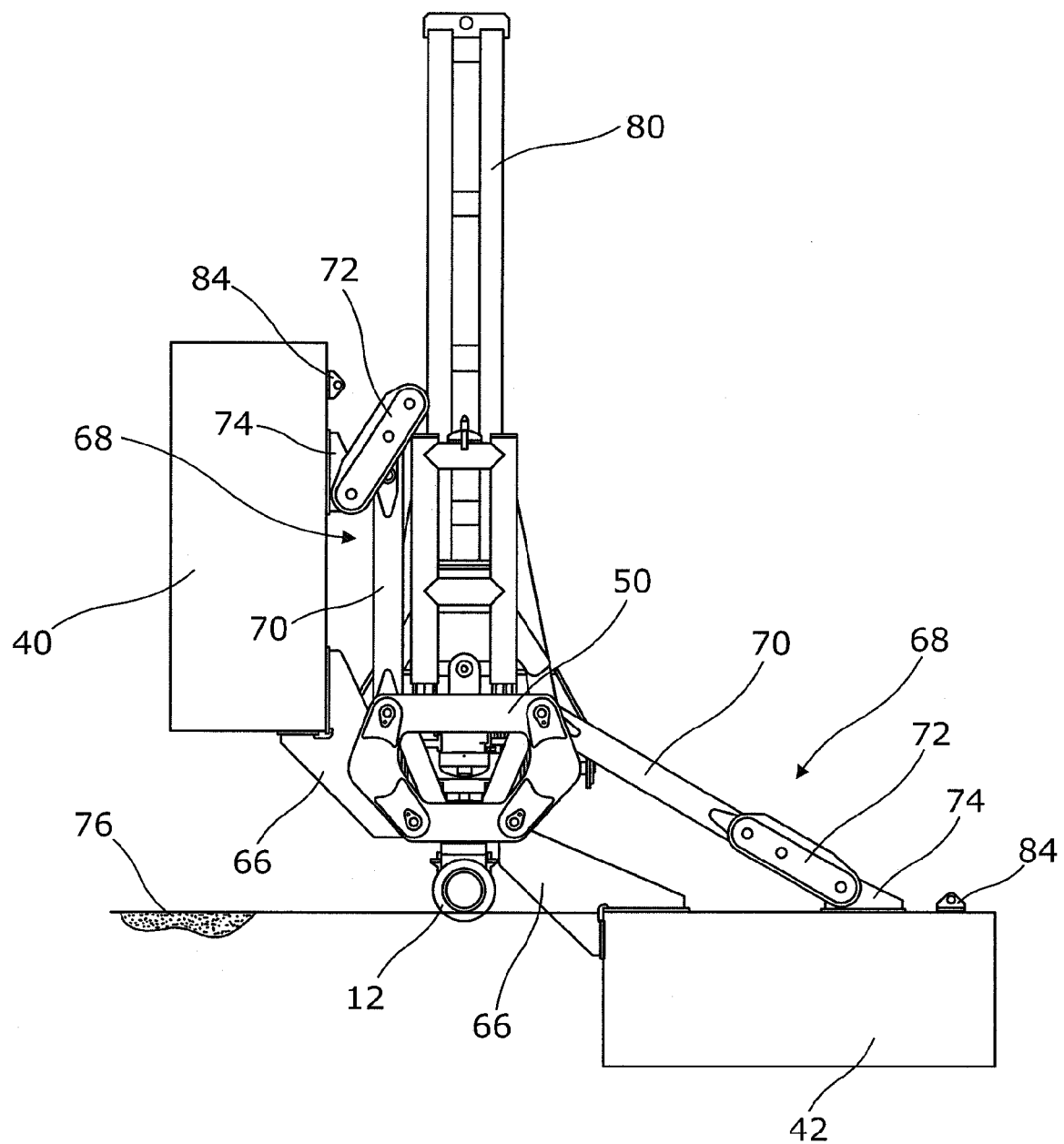
FIG. 7 is an end view of the ILT of FIGS. 4 to 6 in the direction of arrow VII of FIG. 4.

Thus, the articulated links 68 of a folded mudmat 40 collapse to enable folding, whereas the articulated links 68 of a deployed mudmat 42 align to straighten and extend the links 68. The outer arm 72 bears against the top of the inner arm 70 when an articulated link 68 straightens as a mudmat 40, 42 is deployed, to prevent the articulated link 68 adopting an over-centre state. This locks the mudmats 40, 42 in the deployed position. The mudmats 40, 42 lie substantially level and coplanar with each other and with the seabed 76 upon deployment, with their skirts embedded in the seabed 76 as shown in FIG. 7.

FIGS. 4 to 7 also show a buoyancy block support 78 attached to one end structure 48 of the ILT 36 and a buoyancy block ladder 80 attached to the other end structure 50 of the ILT 36. These features are provided for attaching rigging to the ILT 36 to support its weight before landing on the seabed. Buoyancy issues will be discussed further below with reference to FIGS. 10 and 11 of the drawings.

Figure 8:
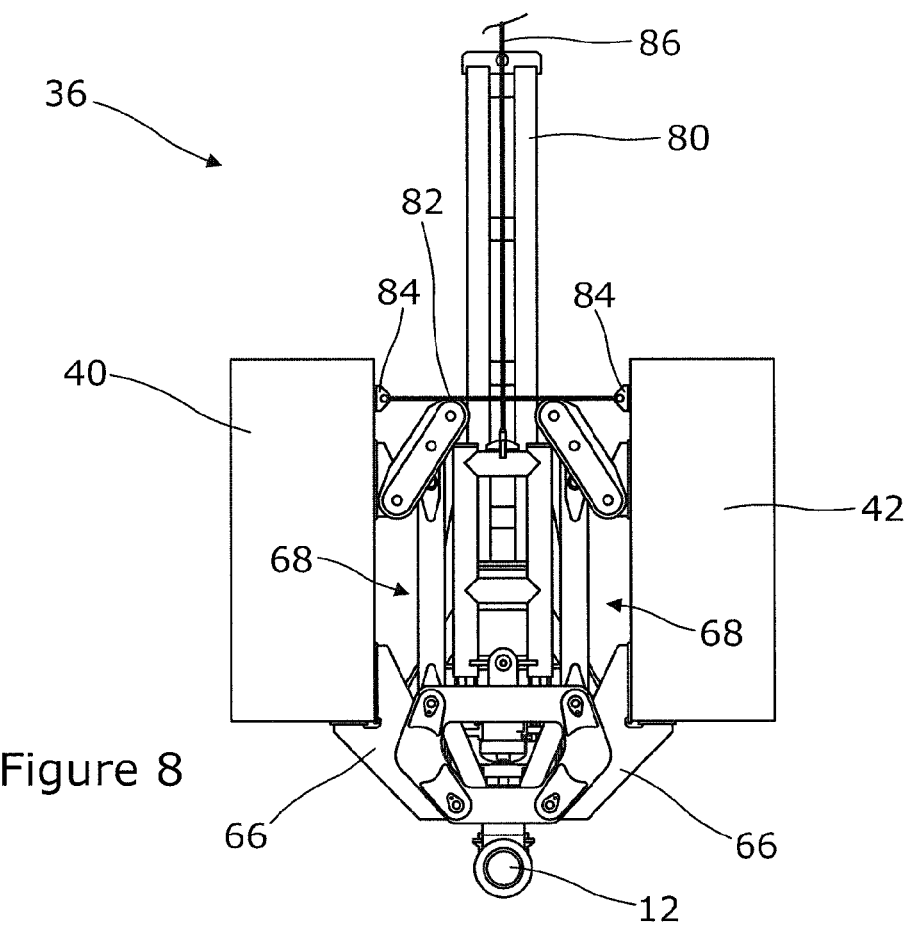
FIG. 8 is an end view of the ILT of FIGS. 4 to 7 but showing both mudmats in the folded position.
Figure 9:
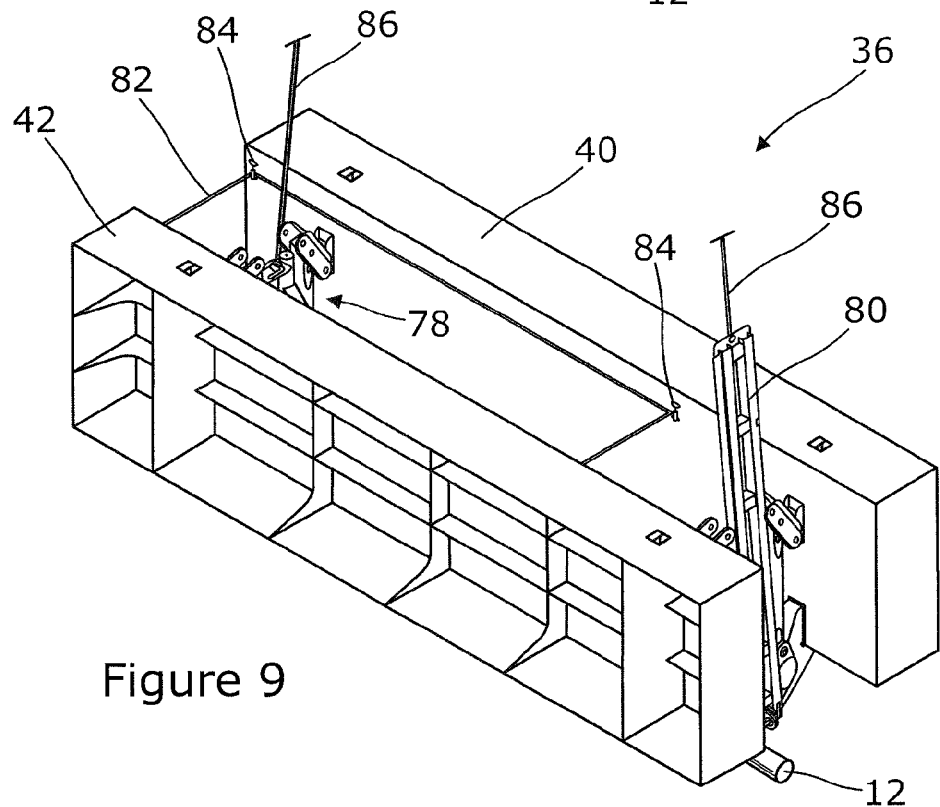
FIG. 9 is a perspective view of the ILT of FIG. 8.

Moving on initially to FIGS. 8 and 9 of the drawings, these show the ILT 36 with both mudmats 40, 42 in the folded position. When folded as shown in those drawings, the mudmats 40, 42 are positioned high enough to be above the V-shape at the bottom of the envelope of the free passage as shown in FIG. 3. The structure can then go through all of the obstacles in the firing line, provided that the mudmats 40, 42, arms 66 and links 68 are added to the structure after the tensioners.

The mudmats 40, 42 are held in the folded position by a single rope 82, so that an ROV can release both mudmats 40, 42 simultaneously simply by cutting the rope 82 at one point in a single operation upon deployment. Preferably, as shown in FIGS. 8 and 9, a loop of rope 82 is provided. This extends through longitudinally-spaced pairs of eyes 84 provided on the upper face of each mudmat 40, 42, which faces inwardly when folded.

The loop of rope 82 holds the mudmats 40, 42 securely in the folded position but provides easy access for cutting by an ROV upon deployment. Conveniently, the cutting point will be at the end of the ILT 36 adjacent the buoyancy block support 78. The pairs of eyes 84 are offset toward the corresponding end of the mudmats 40, 42 for that purpose. The loop of rope 82 does not clash or interfere with rigging for attachment of buoyancy, including a cable 86 as will be described in more detail below with reference to FIGS. 10 and 11.

Figure 10:
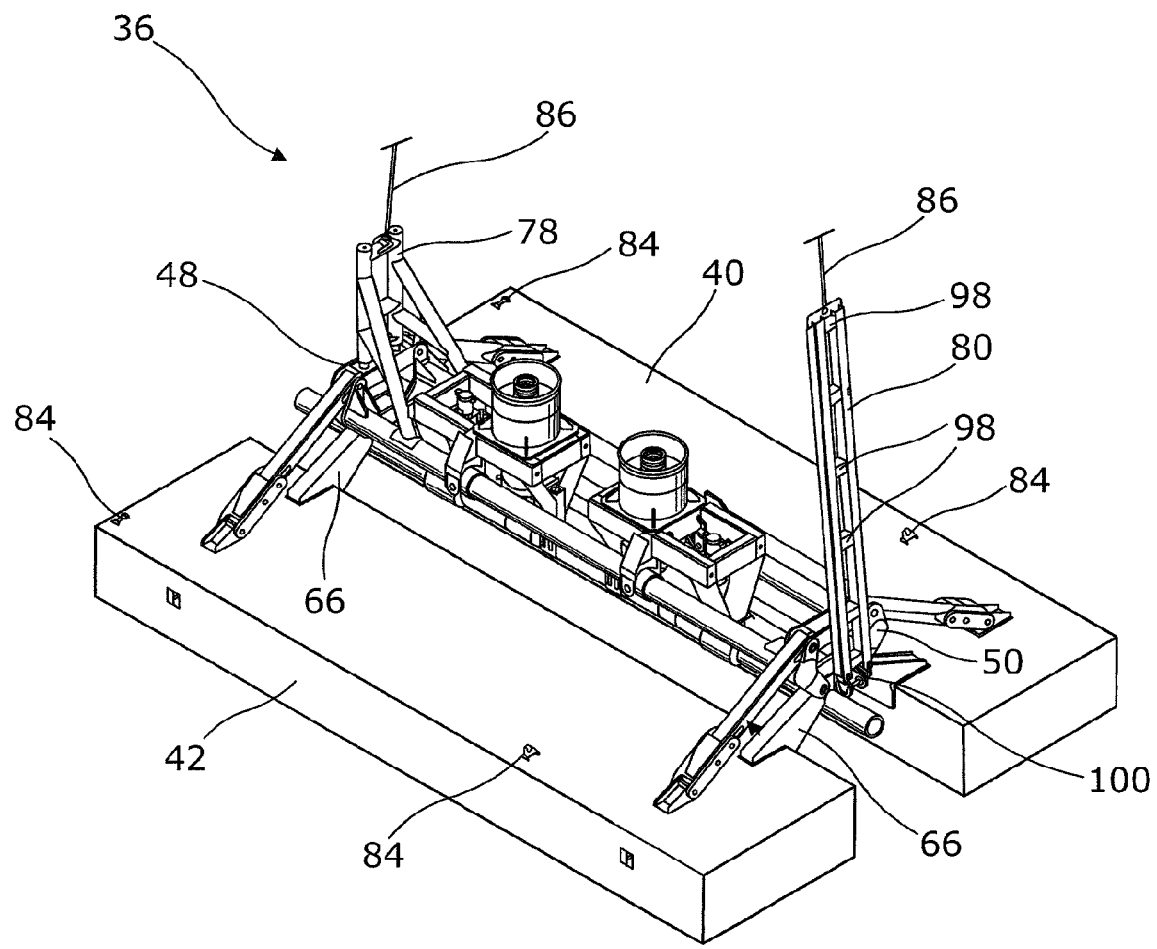
FIG. 10 is a perspective view of the ILT of FIGS. 8 and 9 but with both mudmats now unfolded into the deployed position ready to be landed on the seabed.

Referring now to FIG. 10, the mudmats 40, 42 are shown here deployed just before landing on the seabed, with the ILT 36 in a near-horizontal orientation. Once the rope 82 shown in FIGS. 8 and 9 is cut by an ROV, the mudmats 40, 42 will self-deploy under their own weight. This is because the centre of gravity of each mudmat 40, 42 is outboard of the pivot axis defined by the associated swing arms 66. Rotation is easier to realize than a translation, and it is desirable to minimise ROV operations. Thus, the preferred solution described herein has only pivot links, and there is no need to connect locking arms subsea. A damping system may be provided to slow down the deployment of the mudmats 40, 42 if necessary.

FIG. 10 will also be used to describe buoyancy arrangements, with additional reference now to FIG. 11. FIG. 11 shows the stern of an installation vessel 88 having a stinger 90 suspended from it, the stinger 90 being arranged for Steep S-lay operations and hence imparting a near-vertical departure angle to the pipe 12 being launched from the vessel 88.

An ILT 36 in line with the pipe 12 is shown in FIG. 11 traversing the stinger 90 in two positions and orientations, one earlier position near the top of the stinger 90 where the pipe 12 is nearer horizontal, and the other later position near the bottom of the stinger 90 where the pipe 12 is nearer vertical. A crane (not shown) on the vessel 88 takes the weight of the ILT 36 via support rigging comprising a length of the aforementioned cable 86 that hangs from a buoy 92 via a sheave 94 as shown in FIG. 11. The crane lowers the buoy 92 into the water as the ILT 36 leaves the stinger 90, whereupon the buoyancy of the buoy 92 takes over to support the ILT 36 during its descent. The crane cable 96 may then be detached from the buoy 92.

The buoyancy of the buoy 92 is necessary during installation for two main reasons. Firstly, it is necessary to relieve the pipe 12 of the weight of the ILT 36: the pipe 12 is not strong enough to support the presence of such a heavy structure. Consequently, buoyancy is added to set the apparent weight in water of the structure at a little above neutral, i.e. with slightly negative buoyancy. Neutral or positive buoyancy would prevent the ILT 36 from landing correctly; also, the pipe 12 could be damaged when the buoyancy is disconnected from the ILT 36. Secondly, it is necessary to ensure that the ILT 36 will land upright: the centre of gravity of the structure is above the level of the pipe 12, so the ILT 36 would turn around the pipe 12 during the descent and land upside down unless measures are taken to prevent that.

Mention has already been made of the buoyancy block support 78 attached to one end structure 48 of the ILT 36 and the buoyancy block ladder 80 attached to the other end structure 50 of the ILT 36. These features anchor and interact with the cable 86 that hangs from the buoy 92 via the sheave 94. One end of the cable 86 is anchored to the top of the buoyancy block support 78 and the other end of the cable 86 is anchored to the top of the buoyancy block ladder 80. However, the cable 86 is free to slide through the sheave 94 to vary the relative lengths of the inclined sections of cable 86 as the orientation of the ILT 36 changes to follow the S-curvature of the pipe 12 during overboarding and descent.

The cable 86 is anchored to the buoyancy block support 78 at a level close to the top of the mudmats 40, 42 when folded. By virtue of this, the cable 86 does not clash with the folded mudmats 40, 42 during overboarding and descent. Nor does the cable 86 interfere with the subsequent deployment of the mudmats 40, 42.

In principle, the point of application of stabilising side force from the cable 86 needs to be above the centre of gravity of the ILT 36 to keep the structure upright. In practice, the point of application needs to be as high as reasonably possible above the centre of gravity of the ILT 36 to counteract the effects of dynamic and hydrodynamic loads on the structure. This is the reason for the length of the ladder 80, which creates a large lever arm bearing against the cable 86 as high as possible to prevent rotation of the ILT 36.

To increase the stiffness of the ladder 80, rung-like crossmembers 98 are spaced from the base of the ladder 80 to its free end as shown in FIG. 10.

As FIG. 11 shows, the ladder 80 is disposed at the upper or trailing end of the ILT 36 with respect to the direction of descent. To accommodate changes in the orientation of the ILT 36 during overboarding and descent, the ladder 80 is pivotably attached at its base to the ILT 36 via a hinge 100 on the end structure 50. This hinge 100 is shown in the more detailed view of FIG. 10. The pivot axis of the hinge 100 is orthogonal to the longitudinal axis of the pipe 12. To resist rotation of the ILT 36 during deployment, the ladder 80 is not free to turn about other axes with respect to the ILT 36.

Once the ILT 36 has been deployed on the seabed as described above, the buoyancy block support 78, the buoyancy block ladder 80, the cable 86 and the buoy 92 may be removed from the ILT 36 by an ROV.

The invention claimed is:

1. A pipeline for laying subsea following fabrication on a surface vessel, the pipeline comprising:
   a rigid pipe that can be bent during laying; and
   an accessory attached in line with the pipe such that the accessory can be laid with the pipe into water and can touch down on the sea bed with the pipe, the accessory comprising:
   a foundation including one or more mudmats arranged to rest on the sea bed when the pipe is laid and movable with respect to the frame between a folded position and a deployed position,
   a rigid pipe support frame attached to the foundation defining a pipe course; and
   at least one carriage arranged to support the pipe or a fitting attached to the pipe, the at least one carriage being movable with respect to the frame in a direction generally parallel to the pipe course;
   wherein at least one angularly movable connection acting between the pipe or fitting and the frame allows the pipe or fitting supported by the at least one carriage to tilt locally with respect to the frame as the pipe bends during laying.

2. The in-line accessory of claim 1, wherein the at least one carriage is attached to the frame via the at least one angularly movable connection.

3. The in-line accessory of claim 1, wherein the at least one angularly movable connection decouples the rigidity of the frame from the pipe under loads in a generally vertical plane that bend the pipe during laying.

4. The in-line accessory of claim 1, wherein the at least one carriage resists movement of the pipe or fitting relative to the frame in a direction transverse to the pipe course.

5. The in-line accessory of claim 1, wherein one of the at least one angularly movable connection comprises a pivot joint acting between one of the at least one carriage and the frame.

6. The in-line accessory of claim 5, wherein the pivot joint has a pivot axis substantially orthogonal to the pipe course.

7. The in-line accessory of claim 1 and comprising at least two carriages each arranged to support the pipe or the fitting attached to the pipe, the at least two carriages being movable independently with respect to the frame in a direction generally parallel to the pipe course and each being attached to the frame via at the least one angularly movable connection that allows the pipe or fitting supported by the carriage to tilt with respect to the frame as the pipe bends during laying.

8. The in-line accessory of claim 7, wherein the carriages are movable in series on the frame.

9. The in-line accessory of claim 1, wherein the frame comprises at least one rail substantially aligned with the pipe course, along which the at least one carriage is movable.

10. The in-line accessory of claim 9 comprising at least two rails with a gap between, at least one of the at least two rails being disposed to each side of a plane containing the pipe course, with each carriage being engaged with the at least two rails, intersecting the plane and bridging the gap between the at least two rails.

11. The in-line accessory of claim 10, wherein the one or more mudmats is movable with respect to the frame about a pivot axis.

12. The in-line accessory of claim 10, wherein the one or more mudmats has a center of gravity that is outboard of the pivot axis when in the folded position.

13. The in-line accessory of claim 10, and further comprising a restraint for holding the one or more mudmats in the folded position against gravitational force acting to move the one or more mudmats into the deployed position.

14. The in-line accessory of claim 13, wherein the restraint is a rope or other element that is cut or otherwise released by a remote operated vehicle (ROV).

15. The in-line accessory of claim 13, wherein the restraint acts on at least two of the one or more mudmats and is capable of releasing the at least two of the one or more mudmats simultaneously for coordinated movement into the deployed position.

16. The in-line accessory of claim 10, wherein in the folded position, a mudmat is elevated above a level of the pipe course and in the deployed position, the mudmat is lowered toward the level of the pipe course.

17. The in-line accessory of claim 1, wherein the frame comprises a plurality of generally parallel longitudinal structural members, at least one of the structural members being a rail along which the carriage is movable.

18. The in-line accessory of claim 1, further comprising a variable-length link between a mudmat and the frame.

19. The in-line accessory of claim 18, wherein the link is lockable in an extended position when the mudmat is in the deployed position.

20. The in-line accessory of claim 1, wherein a fitting attached to the pipe comprises a piping branch, a connector, a valve and a valve actuator.

21. The in-line accessory of claim 20, wherein the at least one carriage comprises a cradle for supporting a connector.

22. The in-line accessory of claim 21, wherein the cradle further supports a valve actuator beside the connector.

23. The in-line accessory of claim 1, further comprising longitudinally-spaced rigging supports for the attachment of ends of a cable suspended by a sheave through which the cable can pass to support the load of the accessory.

24. The in-line accessory of claim 23, wherein the rigging supports are located at or near opposed ends of the frame.

25. The in-line accessory of claim 23, wherein the rigging supports are located substantially in a vertical plane containing the pipe course.

26. The in-line accessory of claim 23, further comprising the ends of the cable attached to the rigging supports, the ends of the cable being variable in effective length as orientation of the accessory changes during laying.

27. The in-line accessory of claim 23, wherein at least one of the rigging supports comprises an elongate lever that extends to an elevated position above the frame to resist rotation of the accessory with respect to a rigging element.

28. The in-line accessory of claim 27, wherein the elongate lever is hinged on an axis transverse to the pipe course, to pivot as orientation of the accessory changes during laying.

29. The in-line accessory of claim 1 is substantially symmetrical about a vertical plane containing the pipe course.

30. The in-line accessory of claim 1, wherein the frame comprises a plurality of generally parallel longitudinal structural members, at least one of the structural members being a rail along which the at least one carriage is movable, and the pipe is supported beneath the structural members of the frame.

31. The in-line accessory of claim 1, wherein the pipe comprises at least one piping branch extending transversely with respect to the pipe.

32. The in-line accessory of claim 31, wherein the at least one piping branch leads to a valve.

33. The in-line accessory of claim 32, further comprising a valve actuator for operating the valve, the actuator being rotatable about an axis transverse to the pipe.

34. The in-line accessory of claim 33, wherein the axis of rotation of the actuator is generally vertical when the accessory is on the seabed in use.

35. The in-line accessory of claim 31, wherein the at least one piping branch leads to a connector.

36. The in-line accessory of claim 35, wherein the piping branch, the valve and the connector are substantially coplanar with the pipe.

37. The in-line accessory of claim 31, wherein the pipe comprises at least two piping branches extending transversely with respect to the pipe.

38. The in-line accessory of claim 37, wherein the piping branches diverge or converge as the pipe bends during laying within a plane that contains pivot couplings and the pipe.

39. A method of laying a subsea pipeline from a vessel, comprising:
   overboarding an accessory attached in line with a rigid pipe directly or via a pipe fitting and that is longitudinally rigid in relation to the pipe, the pipe being movable longitudinally with respect to the in-line accessory when laid and being able to be bent during laying and the in-line accessory being able to be laid with the pipe into water and being able to touch down on the sea bed with the pipe and the accessory comprising
   a foundation including one or more mudmats arranged to rest on the sea bed when the pipe is laid and movable with respect to the frame between a folded position and a deployed position;
   attaching a rigid pipe support frame to the foundation;
   causing the pipe to bend about a center of curvature above or below the pipe; and
   accommodating said bending of the pipe by permitting angular movement of the pipe or the fitting where attached to the in-line accessory, by at least one angularly movable connection acting between the pipe or fitting and a frame of the in-line accessory wherein the accessory is installed with the pipe on the surface vessel.

40. The method of claim 39, wherein the in-line accessory resists lateral movement of the pipe relative to the in-line accessory in a direction transverse to a longitudinal axis of the pipe.

41. The method of claim 39, where the pipe is attached to the in-line accessory directly or via a pipe fitting at two or more longitudinally-spaced locations, at each of which locations angular movement of the pipe or the fitting relative to the in-line accessory is permitted.

42. The method of claim 39, further comprising permitting longitudinal movement of the pipe or the fitting relative to the in-line accessory in a direction parallel to a longitudinal axis of the pipe.

43. A method of claim 39, further comprising supporting a load of the in-line accessory with ends of a cable attached to the accessory at longitudinally-spaced locations.

44. The method of claim 43, wherein the longitudinally-spaced locations are substantially located on a central longitudinal axis of the in-line accessory.

45. The method of claim 43, comprising varying the effective length of the ends of the cable as orientation of the in-line accessory changes during laying.

46. The method of claim 43, comprising applying stabilizing leverage to a rigging element at an elevated position above the in-line accessory.

47. The method of claim 39, comprising simultaneously deploying foundation members from the in-line accessory in opposed lateral directions with respect to a longitudinal axis of the pipe.

48. The method of claim 39, practiced in an S-lay operation involving bending the pipe over a stinger.

\* \* \* \* \*